May 18, 1926.
F. O. FARWELL
1,585,335
ADJUSTABLE SPOTLIGHT BRACKET
Filed Nov. 22, 1924
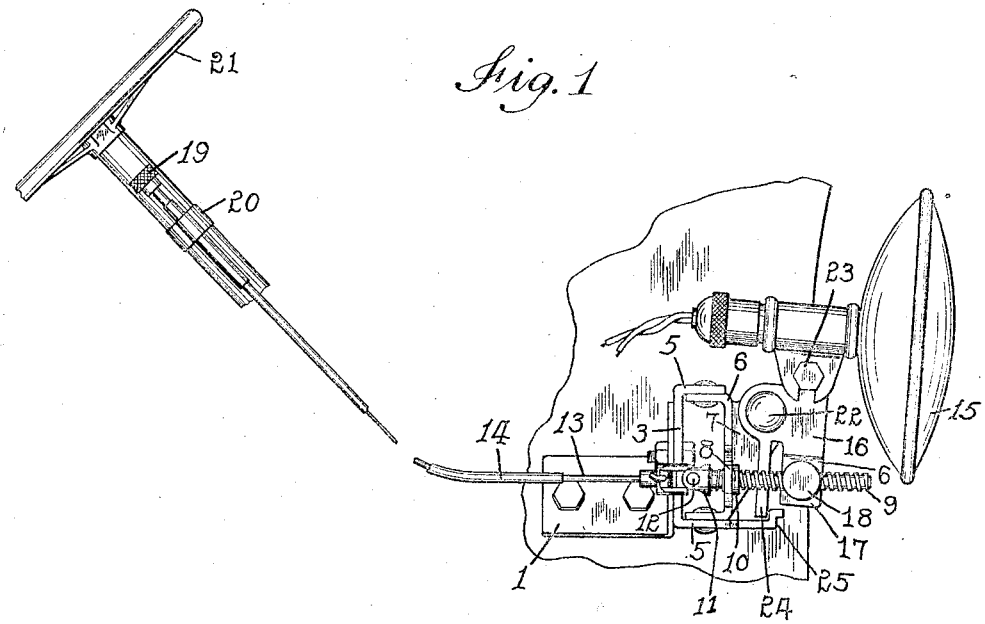
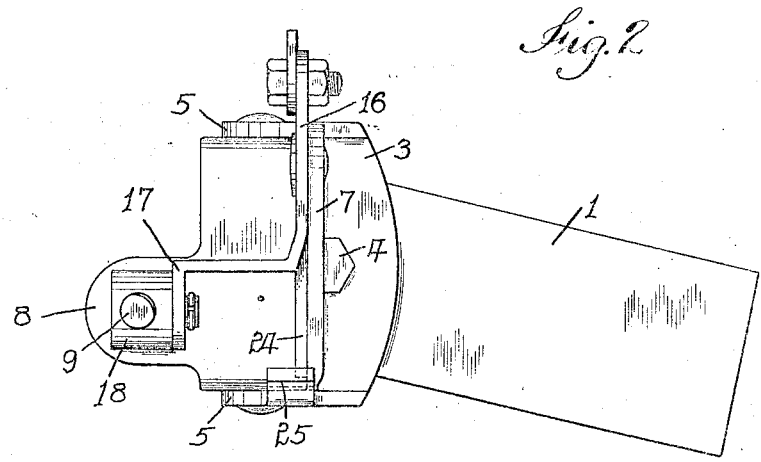

Patented May 18, 1926.

1,585,335

UNITED STATES PATENT OFFICE.

FAY O. FARWELL, OF TOLEDO, OHIO.

ADJUSTABLE SPOTLIGHT BRACKET.

Application filed November 22, 1924. Serial No. 751,452.

My invention has for its object to provide an adjustable spot light bracket operated by a remote controlling means whereby the focused rays of the spot light may be directed to any point within a wide range or compass, and so as to readily place the focal axis of the lamp in any vertical or horizontal angle to any line of reference such as a line extending longitudinally along an automobile to which the spot light and its bracket may be connected.

The invention may be embodied in parts having different arrangements. In the preferred form of my invention the lamp bracket is operated by a wire, having a handle located so as to be convenient for operation of the driver of the automobile and is connected to a member that is supported for swivel movements in horizontal and vertical planes, the lamp being connected to the said member, whereby its focal axis may be directed at any point in a wide range or compass.

To illustrate a practical application of the invention, I am selecting a particular structure, as an example of structures containing the invention and shall describe it hereinafter. The structure selected is shown in the accompanying drawing.

Figure 1 is a side view of the spot light bracket. Fig. 2 is an end view of the bracket.

In the form of construction shown in the drawing means is provided for supporting the bracket on a front fender of an automobile. It consists of the fixed bracket member 1 so shaped as to support the spot light bracket in a desired position. The bracket 1 may be altered in form to connect the spot light bracket to any suitable part of the automobile.

The spot light bracket 2 has a frame member 3 which is connected to the bracket 1 by a suitable bolt 4. The supporting member 3 is provided with a pair of ears 5 in which is journaled a knuckled member 6 having the arms 7 and 8. A threaded or screw member 9 is rotatably secured in the outer end of the arm 8 and so as to have a certain amount of loose play within the arm. To retain the screw member 9 in position the arm 8 is provided with a shoulder or washer 10. Its end has a head 11. These parts are located on opposite sides of the arm 8 and allow, with some latitude, angular movement of the screw 9. If desired the head 11 may be so formed as to constitute a part of a universal joint, it being provided with a pin 12 to which the end of a stiff wire 13 may be connected, so as to be movable about the axis of the pin 12. The wire 13 is encased in a sleeve or tube 14, to direct the wire when pulled or pushed to produce longitudinal movements. When therefore, the wire 13 is rotated the screw member 9 will be rotated and when the wire 13 is shifted lengthwise the journaled member 6 will be rotated.

A spot light 15 may be adjustably connected to the end of an arm 16. The arm 16 is pivotally connected on the outer end of the arm 7. The arm 6 is connected to the screw member 8 by means of a laterally protruding part 17 and a swiveled eye-member 18 which is threaded to receive the screw member 9. When, therefore, the screw member 9 is rotated by rotation of the wires 13, the swiveled threaded eye-member 18 will swing the arm 16 about its axis of oscillation in the end of the arm 7. Thus when the wire 13 is rotated the arm 16 may be placed at different angles with respect to the arm 7 and when the wire 13 is pushed or pulled, the arm 16 will be rotated about the axis of the knuckled member 6. Thus the spot light 15 may be placed in different angular positions with respect to the horizontal and vertical planes by movement of the arm 16 about its horizontal axis extending through the arm 7, and about the vertical axis extending through the journaled member 6.

A suitable handle or knob 19 may be connected to the end of the wire 13 which may be located in any convenient or handy position near the driver's seat so that the driver may readily adjust the bracket to throw the light in any direction, within, of course, the limitations of the movements of the screw member 9 in the arm 8 and the movements of the arms 7 and 8 relative to the supporting member 3. The end of the tube 14 may be connected to the steering post by means of the bracket 20 and so as to locate the knob in proximity to the steering wheel 21.

Preferably the arm 16 is swiveled to the arm 7 at a point, such as through the pin 22, which is located in proximity to the point of connection of the spot light 15 with the member 16, such as near to the connecting bolt 23, and also in proximity to the swiveled nut 18 whereby short movements of the swiveled nut caused by the rotation of the threaded member 9 will cause marked angular movements of the lamp.

The lamp is also provided with means for preventing sweeping lateral movements of the lamp unless it is dipped below a certain angle. The member 16 is provided with a finger 24 and the frame 3 is provided with a finger 25 which extends in the path of the finger 24 when the lamp is swung about the vertical axis unless the lamp is dipped sufficiently about the horizontal axis to bring the finger 24 behind the finger 25.

I claim:—

1. In a control mechanism for an automobile head light, a bracket secured to a part of an automobile, a member vertically pivoted on said bracket, a second member horizontally pivoted on said first member, a lamp secured to the said second member, a control member located in proximity to the driver's seat of the automobile, a rod connected to the control member, a screw connected to the rod for actuating the horizontally pivoted member and the vertically pivoted member, whereby the rotating of the control member will move the axis of the light of the lamp in one plane and the longitudinal movement of the control member will move the axis of the lamp in another plane.

2. In a spot light bracket, a supporting member, a member journaled in the supporting member, an arm pivotally connected to the journaled member, a threaded member rotatably connected to the journaled member for oscillating the said arm, means for operating the threaded member to rotate the spot light about the axis of rotation of the journaled member, and to rotate the spot light about the axis of the said arm, the arm and the supporting member having fingers that interengage on movement of the spot light about the axis of rotation of the journaled member unless the spot light has been rotated a predetermined distance about the axis of the arm.

In testimony whereof I have hereunto signed my name to this specification.

FAY O. FARWELL.